United States Patent [19]

Matier et al.

[11] 3,855,218

[45] Dec. 17, 1974

[54] 5-ARYL-1,2,4-THIADIAZINE 1,1-DIOXIDES AND 5,6-DIHYDRO-ARYL-1,2,4-THIADIAZINE 1,1-DIOXIDES

[75] Inventors: William L. Matier; William T. Comer, both of Evansville, Ind.

[73] Assignee: Mead Johnson & Company, Evansville, Ind.

[22] Filed: June 11, 1973

[21] Appl. No.: 368,549

[52] U.S. Cl. ............................ 260/243 R, 424/246
[51] Int. Cl. ............................................ C07d 93/22
[58] Field of Search ................................ 260/243 R

[56] References Cited
UNITED STATES PATENTS 3,755,312  8/1973  Anderson et al. .................. 260/243

Primary Examiner—John M. Ford
Attorney, Agent, or Firm—Robert H. Uloth; Robert E. Carnahan

[57] ABSTRACT

Cyclization of α-bromostyrylsulfonylamidines and styrylsulfonylamidines provide 5-aryl-1,2,4-thiadiazine 1,1-dioxides and 5,6-dihydro-5-aryl-1,2,4-thiadiazine 1,1-dioxides respectively. These substances have utility as analgesics and hypotensive agents. Compounds illustrating the invention are 3-methyl-5-phenyl-4H-1,2,4-thiadiazine 1,1-dioxide, 5-(4-chloro-3-sulfamoylphenyl)-3-methyl-4H-1,2,4-thiadiazine 1,1-dioxide and 5,6-dihydro-3-methyl-5-phenyl-4H-1,2,4-thiadiazine 1,1-dioxide.

11 Claims, No Drawings

5-ARYL-1,2,4-THIADIAZINE 1,1-DIOXIDES AND 5,6-DIHYDRO-ARYL-1,2,4-THIADIAZINE 1,1-DIOXIDES

BACKGROUND OF THE INVENTION

This invention is broadly concerned with 5-aryl-1,2,4-thiadiazines having drug and bio-affecting properties. More particularly, the invention relates to 5-aryl-1,2,4-thiadiazine 1,1-dioxides and 5,6-dihydro-5-aryl-1,2,4-thiadiazine 1,1-dioxides. The 5-aryl-1,2,4-thiadiazines of the invention possess hypotensive and analgesic utility.

With respect to the state of the art, relatively few examples of compounds containing non fused-ring 1,2,4-thiaoiazine 1,1-dioxides have been prepared, refer Chemical Reviews, 70, 603 (1970). The 1,2,4-thiadiazine 1,1-dioxides of the present invention are distinct and novel in that they represent a class of non fused-ring 1,2,4-thiadiazine 1,1-dioxides containing an aryl substituent in the 5-position in contrast to fused-ring 1,2,4-benzothiadiazine 1,1-dioxide compounds exemplified by the non-diuretic antihypertensive agent diazoxide. French Pat. No. 2,036,528 discloses the preparation of certain specific 5,6-dihydro-1,2,4-thiadiazine 1,1-dioxides but these compounds do not have a 5-aryl substituent.

SUMMARY OF THE INVENTION

This invention is concerned with a new class of 1,2,4-thiadiazines. More particularly, the invention pertains to 5-aryl-4H-1,2,4-thiadiazine 1,1-dioxides of Formula I, 5-aryl-5,6-dihydro-4H-1,2,4-thiadiazine 1,1-dioxides of Formula II and pharmaceutically acceptable metal or di(lower)alkylamine salts thereof.

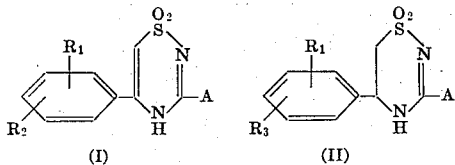

In the above formulas, the symbols "$R_1$, $R_2$, $R_3$ and A" have the following meanings:

$R_1$ represents a member of the group consisting of hydrogen or halogen. $R_2$ represents hydrogen, halogen, nitro, sulfamoyl, or lower alkyl of from 1 to 4 carbon atoms inclusive. $R_3$ represents hydrogen, halogen, cyclohexyl, or lower alkyl of 1 to 4 carbon atoms inclusive.

The symbol "A" represents a member of the group consisting of lower alkyl of 1 to 3 carbon atoms inclusive, phenyl or benzyl.

It is to be understood that by employment of the term "lower alkyl" it is meant that the carbon chains of each group include both straight and branched chain radicals of the designated number of carbon atoms. Exemplary of carbon chain radicals containing 1 to 4 carbon atoms are methyl, ethyl, propyl, isopropyl, 1-butyl, 1-methylpropyl, 2-methylpropyl, and tert.-butyl. The term "halogen" as used herein comprehends all members of that group, i.e., chlorine, bromine, fluorine and iodine.

The term "pharmaceutically acceptable alkali metal salts" used herein comprehends a metal salt of the substances of Formula I and Formula II in which the metal (e.g., sodium, potassium, lithium) contributes little to the pharmacologic action of the compound. The 1,2,4-thiadiazines of Formula I and Formula II are converted to the corresponding salt by admixture with an equivalent of a suitable alkali metal reagent such as potassium hydroxide, sodium hydroxide, lithium hydroxide and the like in an inert solvent such as water and removing the water under reduced pressure.

The term "di(lower)alkylamine salts" used herein comprehends a combination of the substances of Formula I and Formula II with a di(lower)alkylamine such as diethylamine wherein the expression "lower alkyl" connotes carbon chain radicals containing from 1 to 4 carbon atoms.

Those skilled in the art will recognize that 1,2,4-thiadiazines of Formula I and Formula II can exist in more than one tautomeric modification as depicted by Formulas I$a$, I$b$, II$a$, and II$b$ wherein $R_1$, $R_2$, $R_3$ and A have the meanings previously defined.

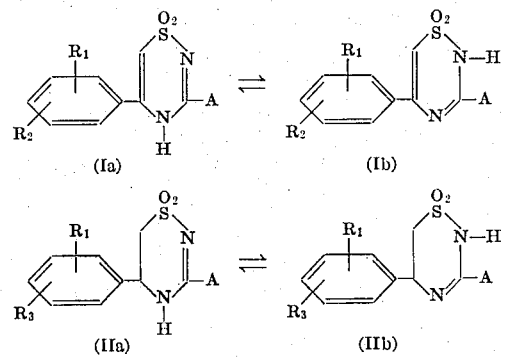

Although the double bond may occupy either the 2,3- or 3,4-positions of Formulas I$A$ –$b$ or II$A$ –$b$, a predominance of one tautomer would be expected in different chemical environments. In aqueous alkali, for example, the anion is thought to be a resonance hydrid of possible tautomeric forms with the predominant tautomer having a double bond at the 3,4-position (Formulas I$b$ and II$b$). Under neutral conditions, the double bond at the 2,3-position (Formulas I$a$ and II$a$) appears to dominate according to infrared and ultraviolet studies.

The 1,2,4-thiadiazines of this invention characterized by Formula I and Formula II are obtained by a method which comprises cyclizing a styrylsulfonylamidine of the formula

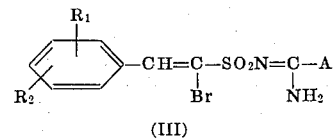

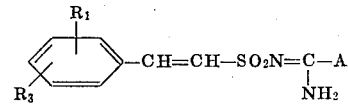

wherein $R_1$, $R_2$, $R_3$ and A are as herein above defined. Cyclization is preferably carried out in a reaction inert solvent under basic conditions.

With α-bromostyrylsulfonylamidines of Formula III, cyclization is conveniently effected in 5% sodium hydroxide solution at elevated temperatures, preferably about 100°C. At this temperature, the reaction is essentially complete in from about 0.5 to 1 hr. The substances of Formula I wherein $R_2$ is sulfamoyl and A is lower alkyl can also be obtained by chlorosulfonylation of the corresponding 5-aryl-4H-1,2,4-thiadiazine 1,1-dioxide of Formula I followed by ammonolysis.

With N-styrylsulfonyl)amidines of Formula IV, cyclization is preferably performed in acetone at 25°C.; but temperatures ranging from 0° to 56°C. are also operable. Other solvents such as dimethylsulfoxide can also be employed as a reaction medium for cyclizing certain of the N-(styrylsulfonyl)amidines of Formula IV. In dimethylsulfoxide, for instance, N-(styrylsufonyl)acetamidine or N-(styrylsulfonyl)benzamidine provide yields on the order of 60–80% of the respective 3-methyl or 3-phenyl substituted 5-phenyl-5,6-dihydro-1,2,4-thiadiazine 1,1-dioxides. On the other hand, with N-(3,4-dichlorostyrylsulfonyl)-phenylacetamidine, only a 3% yield of the thiadiazine product is obtained in dimethylsulfoxide whereas in acetone the yield is appreciably increased to 31%. The rate of cyclization of the N-(styrylsulfonyl)amidines is also influenced by the inductive effect of the $R_1$ and $R_2$ substituents. Strong electron-withdrawing substituents such as nitro greatly enhance the tendency to cyclize. N-(4-Nitrostyrylsulfonyl)amidine, for example, provides a substantial amount of the thiadiazine product in either acetone or dimethylsulfoxide in 5 min. at 5°–10°C.

The α-bromostyrylsulfonylamidine (Formula III) and styrylsulfonylamidine (Formula IV) precursors of the compounds of the present invention characterized by Formula I and Formula II are obtained by reacting an α-bromostyrylsulfonyl chloride of the formula

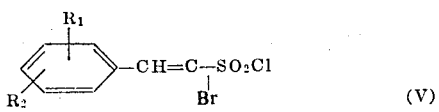

(V)

or a styrylsulfonyl chloride of the formula

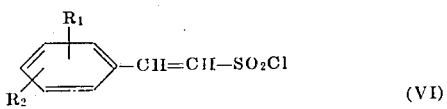

(VI)

with an amidine of the formula

(VII)

wherein $R_1$, $R_2$ and A are as herein defined.

Styrene intermediates employed in the preparation of styrylsulfonyl chlorides are obtained from the corresponding benzaldehydes by the procedure of L. A. Brooks, J. Amer. Chem. Soc., 66, 1295 (1944). Conversion of the styrene intermediates to styrylsulfonyl chlorides of Formula VI is carried out by the method of F. G. Bordwell, et al., J. Amer. Chem. Soc., 68, 139 1778 (1946). α-Bromostyrylsulfonyl chlorides of Formula V are prepared by photolytic bromination, followed by dehydrobromination, of the corresponding styrylsulfonyl chlorides of Formula VI according to the method of C. S. Rondestvedt, Jr., J. Amer. Chem. Soc., 76, 1926 (1954).

The amidine intermediates of Formula VII are generally known compounds available from commercial sources or they are conveniently prepared according to the methods of L. Weintraub, et al., J. Org. Chem., 33, 1679 (1968) and P. Oxley, et al., J. Chem. Soc., 147 (1946), 303 (1948).

Compounds of the present invention characterized by Formula I and Formula II and their pharmaceutically acceptable metal addition salts are useful in that they possess pharmacological activity in animals. In particular, the compounds have analgesic utility as indicated by prevention of the phenylquinone writhing syndrome in mice on subcutaneous or oral administration. The compounds of the invention are further useful as hypotensive agents indicated by a lowering of blood pressure on intravenous or intraduodenal administration of the normotensive anesthetized dog.

The compounds constituting this invention and their methods of preparation will appear more fully from a consideration of the following examples and appended claims which are given for the purpose of illustration only and are not to be construed as limiting the invention in spirit or in scope.

In regard to "NMR" data given below, chemical shift delta values are in parts per million and the following multiplicity notations employed: $s$=singlet, $m$=multiplet (center listed), $bs$=broad singlet, $dd$=doublet of doublets (J values listed). Solvent and internal reference peak are also identified as DMSO-$d_6$=(deuterated dimethylsulfoxide) and TMS=(tetramethylsilane) respectively.

EXAMPLE 1

A suspension of N-(α-bromo-3,4-dichlorostyrylsulfonyl)acetamidine (9.3 g., 0.025 mole) in 100 ml. of 5% sodium hydroxide is stirred at a temperature of 90°C. for a period of 1 hr. The cooled reaction mixture is filtered and the filtrate acidified with 3N hydrochloric acid, affords a white solid. The solid is collected, washed with water and dried at 80°C. under vacuum. Analytically pure 5-(3,4-DICHLOROPHENYL)-3-METHYL-4H-1,2,4-THIADIAZINE 1,1-DIOXIDE, m.p. 253.5°–254.5°C. (corr.), is obtained in 66% yield by crystallization from acetone-isopropyl ether.

Analysis. Calcd. for $C_{10}H_8Cl_2N_2O_2S$ (percent): C, 41.24; H, 2.77; N, 9.62. Found (percent): C, 41.28; H, 2.56; N, 9.65.

NMR (DMSO-$d_6$, TMS reference): 2.30s, 6.83s, 7.83m, 11.50bs.

EXAMPLE 2

N-(α-Bromostyrylsulfonyl)acetamidine treated with sodium hydroxide according to the procedure of Example 1 provides a 66% analytical yield of 3-METHYL-5-PHENYL-4H-1,2,4-THIADIAZINE 1,1-DIOXIDE, m.p. 270.5°–273.5°C. (corr.), from acetonitrile-isopropyl ether.

Analysis. Calcd. for $C_{10}H_{10}N_2O_2S$ (percent): C, 54.01; H, 4.53; N, 12.60; S, 14.42. Found (percent): C, 54.16; H, 4.71; N, 12.87; S, 14.17. NMR (DMSO-$d_6$, TMS reference): 2.30s, 6.63s, 7.61m, 10.93 bs.

EXAMPLE 3

N-(α-Bromo-4-chlorostyrylsulfonyl)acetamidine treated with sodium hydroxide according to the procedure of Example 1 provides a 71% analytical yield of 5-(4-CHLOROPHENYL)-3-METHYL-4H-1,2,4-THIADIAZINE 1,1-DIOXIDE, m.p. 289.5°–291.5°C. (dec.)(corr.), from acetone.

Analysis. Calcd. for $C_{10}H_9ClN_2O_2S$ (percent): C, 46.78; H, 3.53; N, 10.91. Found (percent): C, 46.85; H, 3.57; N, 11.10.

NMR (DMSO-$d_6$, TMS reference): 2.32s, 6,72s, 7.72m, 10.00bs.

EXAMPLE 4

N-($\alpha$-Bromo-3,4-dichlorostyrylsulfonyl)benzamidine treated with sodium hydroxide according to the procedure of Example 1 provides a 86% analytical yield of 5-(3,4-DICHLOROPHENYL)-3-PHENYL-4H-1,2,4-THIADIAZINE 1,1-DIOXIDE, m.p. 306.5°–308.0°C. (corr.), from acetone.

Analysis. Calcd. for $C_{15}H_{10}Cl_2N_2O_2S$ (percent): C, 51.00; H, 2.85; N, 7.93. Found (percent): C, 50.76; H, 2.77; N, 7.80.

NMR (DMSO-$d_6$, TMS reference): 6.97s, 7.88m, 12.00bs.

EXAMPLE 5

N-($\alpha$-Bromostyrylsulfonyl)benzamidine treated with sodium hydroxide according to the procedure of Example 1 provides a 87% yield of 3,5-DIPHENYL-4H-1,2,4-THIADIAZINE 1,1-DIOXIDE, m.p. 258.5°–260.0°C. (corr.), from acetone-isopropyl ether.

Analysis. Calcd. for $C_{15}H_{12}N_2O_2S$ (percent): C, 63.36; H, 4.26; N, 9.86. Found (percent): C, 63.16; H, 4.12; N, 9.76.

NMR (DMSO-$d_6$, TMS reference): 6.81s, 7.68m, 8.10m, 11.92bs.

EXAMPLE 6

N-($\alpha$-Bromo-4-nitrostyrylsulfonyl)acetamidine treated with sodium hydroxide according to the procedure of Example 1 provides 3-METHYL-5-(4-NITROPHENYL)-4H-1,2,4-THIADIAZINE 1,1-DIOXIDE, m.p. > 320°C., from acetonitrile.

The thiadiazine product is also obtained by refluxing $\alpha$-bromo-4-nitrostyrylsulfonyl chloride and excess acetamidine in acetone for a period of 1 hr.

Analysis. Calcd. for $C_{10}H_9N_3O_4S$ (percent): C, 44.92; H, 3.39; N, 15.72. Found (percent): C, 44.82; H, 3.47; N, 15.65.

NMR (DMSO-$d_6$, TMS reference): 2.33s, 6.89s, 7.99m, 8.44m, 9.90bs.

EXAMPLE 7

A solution of 5-(4-chlorphenyl)-3-methyl-4H-1,2,4-thiadiazine 1,1-dioxide (12.8 g., 0.05 mole) obtained according to Example 3 in 100 ml. of chlorosulfonic acid is heated for 1.5 hr. at 130°C. Excess chlorosulfonic acid is removed by distillation and the cooled residue added dropwise to crushed ice. The aqueous mixture is extracted with ethyl acetate, the ethyl acetate extract washed with water and dried over magnesium sulfate. Evaporation of the ethyl acetate solvent provides a residual gum which triturated with ethyl acetate affords a 53% yield of 5-(4-CHLORO-3-CHLOROSULFONYLPHENYL)-3-METHYL-4H-1,2,4-THIADIAZINE 1,1-DIOXIDE, m.p. 220°–225°C. (dec.), from isopropyl acetate.

Ammonia gas is bubbled through a solution of 5-(4-chloro-3-chlorosulfonylphenyl)-3-methyl-4H-1,2,4-thiadiazine 1,1-dioxide (7.1 g., 0.02 mole) in 100 ml. of acetone for a period of 10 min. After evaporating the solvent, the residue remaining is dissolved in hot 5% sodium hydroxide solution, filtered and the filtrate acidified with 3N hydrochloric acid affording a cream-colored precipitate. The precipitate is collected, washed with water and triturated with acetone to provide an 87% yield of the sulfamoyl product, m.p. 303°–310°C. (dec.). The crude product is further purified by dissolving in a solution of 50 ml. of hot methanol and excess diethylamine. Isopropyl ether is added to the solution and on cooling affords 3.6 g. of the diethylammonium salt of the sulfamoyl product, m.p. 300°–305°C. (dec.). The salt taken up in hot 5% sodium hydroxide and acidified with 3N hydrochloric acid provides on cooling analytically pure 5-(4-CHLORO-3-SULFAMOYLPHENYL)-3-METHYL-4H-1,2,4-THIADIAZINE 1,1-DIOXIDE, m.p. 312.5°–316.5°C. (dec.)(corr.).

Analysis. Calcd. for $C_{10}H_{10}ClN_3O_4S_2$ (percent): C, 35.77; H, 3.00; N, 12.51; S, 19.10. Found (percent): C, 35.95; H, 3.04; N, 12.31; S, 19.39.

NMR (DMSO-$d_6$, TMS reference): 2.33s, 6.75s, 7.77bs, 7.90m, 8.23m, 11.80bs.

EXAMPLE 8

The following thiadiazine products of Formula I are obtained by treating the enumerated $\alpha$-bromostyrylsulfonylamidine precursor with sodium hydroxide in acetone according to the procedure of Example 1:

a. N-($\alpha$-Bromo-3,4-dichlorostyrylsulfonyl)-phenylacetamidine provides 3-BENZYL-5-(3,4-DICHLOROPHENYL)-4H-1,2,4-THIADIAZINE 1,1-DIOXIDE.

b. N-($\alpha$-Bromo-2-nitrostyrylsulfonyl)acetamidine provides 3-METHYL-5-(2-NITROPHENYL)-4H-1,2,4-THIADIAZINE 1,1-DIOXIDE.

c. N-($\alpha$-Bromo-4-nitrostyrylsulfonyl)benzamidine provides 3-PHENYL-5-(4-NITROPHENYL)-4H-1,2,4-THIADIAZINE 1,1-DIOXIDE.

d. N-($\alpha$-Bromo-2-fluorostyrylsulfonyl)benzamidine provides 3-PHENYL-5-(2-FLUOROPHENYL)-4H-1,2,4-THIADIAZINE 1,1-DIOXIDE.

e. N-($\alpha$-Bromo-2,5-dichlorostyrylsulfonyl)benzamidine provides 3-PHENYL-5-(2,5-DICHLOROPHENYL)-4H-1,2,4-THIADIAZINE 1,1-DIOXIDE.

f. N-($\alpha$-Bromo-4-sulfamoylstyrylsulfonyl)acetamidine provides 3-METHYL-5-(4-SULFAMOYLPHENYL)-4H-1,2,4-THIADIAZINE 1,1-DIOXIDE.

g. N-($\alpha$-Bromo-4-methylstyrylsulfonyl)acetamidine provides 3-METHYL-5-(4-METHYLPHENYL)-4H-1,2,4-THIADIAZINE 1,1-DIOXIDE.

h. N-($\alpha$-Bromo-4-isopropylstyrylsulfonyl)benzamidine provides 3-PHENYL-5-(4-ISOPROPYLPHENYL)-4H-1,2,4-THIADIAZINE 1,1-DIOXIDE.

i. N-($\alpha$-Bromostyrylsulfonyl)isobutyramidine provides 3-(ISOPROPYL)-5-(PHENYL)-4H-1,2,4-THIADIAZINE 1,1-DIOXIDE.

EXAMPLE 9

N-(styrylsulfonyl)benzamidine (4.3 g., 0.015 mole) is added portion-wise to a stirred mixture of 50% sodium hydroxide (1.2 g., 0.015 mole) in 25 ml. of dimethylsulfoxide. After stirring for a period of 64 hr., at 25°C., the mixture is poured into 250 ml. of cold water and made strongly basic with 5% sodium hydroxide. The basified solution is first extracted several times with ether and then acidified with 3N hydrochloric acid yielding a white precipitate. The precipitate is collected, washed with water and dried affording 2.3 g. (84%) of the 1,2,4-thiadiazine product. Analytically pure 5,6-DIHYDRO-3,4-DIPHENYL-4H-1,2,4-THIADIAZINE 1,1-DIOXIDE, m.p. 235.5°–236.5°C. (corr.) is obtained by crystallization from acetonitrile.

Analysis. Calcd. for $C_{15}H_{14}N_2O_2S$ (percent): C, 62.91; H, 4.93; N, 9.79. Found (percent): C, 62.82; H, 4.85; N, 9.70.

NMR (DMSO-$d_6$, TMS reference): 3.47m, 5.17dd (5.5, 11.2 Hz), 7.55m, 7.93m, 9.67bs.

EXAMPLE 10

N-(styrylsulfonyl)acetamidine treated with sodium hydroxide in dimethylsulfoxide according to the procedure of Example 9 provides a 64% yield of 5,6-DIHYDRO-3-METHYL-5-PHENYL-4H-1,2,4-THIADIAZINE 1,1-DIOXIDE, m.p. 276.5°–278.5°C. (corr.), from acetonitrile.

Analysis. Calcd. for $C_{10}H_{12}N_2O_2S$ (percent): C, 53.55; H, 5.40; N, 12.49. Found (percent): C, 53.73; H, 5.42; N, 12.70.

NMR (DMSO-$d_6$, TMS reference): 2.03s, 3.32m, 4.90dd (4.5, 11.5 Hz), 7.46m, 9.23bs.

EXAMPLE 11

N-(4-chlorostyryl)acetamidine treated with sodium hydroxide in dimethylsulfoxide according to the procedure of Example 9 provides a 27% yield of 5-(4-CHLOROPHENYL)-5,6-DIHYDRO-3-METHYL-4H-1,2,4-THIADIAZINE 1,1-DIOXIDE, m.p. 275.5°–277.5°C. (dec.) (corr.), from acetone-isopropyl ether.

Analysis. Calcd. for $C_{10}H_{11}ClN_2O_2S$ (percent): C, 46.41; H, 4.29; N, 10.83. Found (percent): C, 46.03; H, 4.16; N, 10.72.

NMR (DMSO-$d_6$, TMS reference): 2.04s, 3.32m, 4.99dd (5.0, 11.5 Hz), 7.58m, 9.33bs.

EXAMPLE 12

N-(3,4-dichlorostyrylsulfonyl)phenylacetamidine (0.02 mole) in 100 ml. of acetone and 10 ml. of water is stirred with 50% sodium hydroxide (8 g., 0.1 mole) at 25°C. for a period of 24 hr. The reaction mixture is concentrated, diluted with water and the oily solid which precipitates is extracted with ethyl acetate. The ethyl acetate extract is dried over magnesium sulfate and evaporated. Triturating the residual oil with hot ethanol and filtering provides a 31% of 5-(3,4-CHLOROPHENYL)-5,6-DIHYDRO-3-BENZYL-4H-1,2,4-THIADIAZINE 1,1-DIOXIDE, m.p. 276°–280°C.

Treatment of N-(3,4-dichlorostyrylsulfonyl)-phenylacetamidine with sodium hydroxide in dimethylsulfoxide according to the procedure of Example 1 provides a 3% yield of 5-(3,4-DICHLOROPHENYL)-5,6-DIHYDRO-3-BENZYL-4H-1,2,4-THIADIAZINE 1,1-DIOXIDE.

EXAMPLE 13

Treatment of N-(3,4-dichlorostyrylusulfonyl)-benzamidine with sodium hydroxide in acetone according to the procedure of Example 12 provides 5-(3,4-DICHLOROPHENYL)-5,6-DIHYDRO-3-PHENYL-4H-1,2,4-THIADIAZINE 1,1-DIOXIDE, m.p. 304°–305°C.

Treatment of N-(3,4-dichlorostyrylsulfonyl)benzamidine with sodium hydroxide in dimethylsulfoxide according to the procedure of Example 1 provides a 3% yield of 5-(3,4-DICHLOROPHENYL)-5,6-DIHYDRO-3-PHENYL-4H-1,2,4-THIADIAZINE 1,1-DIOXIDE.

EXAMPLE 14

The following 5,6-dihydrothiadiazine products of Formula II are obtained by treating the enumerated styrylsulfonylamidine precursor with sodium hydroxide in acetone according to the procedure of Example 12:

a. N-(2,5-dichlorostyrylsulfonyl)benzamidine provides 5,6-DIHYDRO-3-PHENYL-5-(2,5-DICHLOROPHENYL)-4H-1,2,4-THIADIAZINE 1,1-DIOXIDE.

b. N-(3,4-dichlorostyrylsulfonyl)acetamidine provides 5,6-DIHYDRO-3-METHYL-5-(3,4-DICHLOROPHENYL)-4H-1,2,4-THIADIAZINE 1,1-DIOXIDE.

c. N-(2-fluorostyrylsulfonyl)benzamidine provides 5,6-DIHYDRO-3-PHENYL-5-(2-FLUOROPHENYL)-4H-1,2,4-THIADIAZINE 1,1-DIOXIDE.

d. N-(4-methylstyrylsulfonyl)acetamidine provides 5,6-DIHYDRO-3-METHYL-5-(4-METHYLPHENYL)-4H-1,2,4-THIADIAZINE 1,1-DIOXIDE.

e. N-(4-methylstyrylsulfonyl)acetamidine provides 5,6-DIHYDRO-3-METHYL-5-(4-METHYLPHENYL)-4H-1,2,4-THIADIAZINE 1,1-DIOXIDE.

f. N-(4-isopropylstyrylsulfonyl)benzamidine provides 5,6-DIHYDRO-3-PHENYL-5-(4-ISOPROPYLPHENYL)-4H-1,2,4-THIADIAZINE 1,1-DIOXIDE.

g. N-(styrylsulfonyl)isobutyramidine provides 5,6-DIHYDRO-3-ISOPROPYL-5-(PHENYL)-4H-1,2,4-THIADIAZINE 1,1-DIOXIDE.

h. N-(4-sulfamoylstyrylsulfonyl)acetamidine provides 5,6-DIHYDRO-3-METHYL-5-(4-sulfamoylphenyl)-4H-1,2,4-THIADIAZINE 1,1-DIOXIDE.

i. N-(3-bromo-4-cyclohexylstyrylsulfonyl)acetamidine provides 5,6-DIHYDRO-3-METHYL-5-(3-BROMO-4-cyclohexylphenyl)-4H-1,2,4-THIADIAZINE 1,1-DIOXIDE, m.p. >300°C.

EXAMPLE 15

PREPARATION OF α-BROMOSTYRYLSULFONYLAMIDINES a. A mixture of acetamidine hydrochloride (7.1 g., 0.075 mole) and 50% sodium hydroxide (6.0 g., 0.075 mole) in 150 ml. of acetone is stirred for a period of 10 min. to liberate the free base. A solution of α-bromostyrylsulfonyl chloride (7.0 g., 0.025 mole), prepared according to the method of C. S. Rondestvedt, Jr., J. Amer. Chem. Soc., 76, 1926 (1954) in 50 ml. of acetone is added drop-wise to the free base mixture at a temperature of 20°–25°C. with stirring. After further stirring for 10 min., the mixture is first concentrated under reduced pressure to remove acetone, and then diluted with 200 ml. of water. Acidification of the aqueous mixture with 3N hydrochloric acid provides a precipitate which is collected and dissolved in chloroform. After drying the chloroform solution over magnesium sulfate, The chloroform solvent is evaporated under reduced pressure to provide the amidine product which crystallized from isopropyl acetate yields 5.8 g., (76%) of analytically pure N-($\alpha$-BROMOSTYRYLSULFONYL)ACETAMIDINE, m.p. 141.0°–143.5°C. (corr.).

Reaction of the $\alpha$-bromostyrylsulfonyl chlorides and amidines enumerated below according to the above procedure provide the following $\alpha$-bromostyrylsulfonylamidine precursors of the products of Formula I:

b. $\alpha$-Bromo-3,4-dichlorostyrylsulfonyl chloride, m.p. 67°–69°C., and acetamidine provide N-($\alpha$-BROMO-3,4-DICHLOROSTYRYLSULFONYL)ACETAMIDINE, m.p. 187.5°–189.0°C. (corr.), from acetone-isopropyl ether.

c. $\alpha$-Bromostyrylsulfonyl chloride and benzamidine provide N-($\alpha$-BROMOSTYRYLSULFONYL)BENZAMIDINE in a yield of 92%. The benzamidine is of sufficient purity to cyclize to the corresponding 1,2,4-thiadiazine without further precipitation but can be crystallized from isopropyl acetate, if desired.

d. $\alpha$-Bromo-3,4-dichlorostyrylsulfonyl chloride and bezamidine provide N-($\alpha$-BROMO-3,4-DICHLOROSTYRYLSULFONYL)BENZAMIDINE, m.p. 140°–144°C.

e. $\alpha$-Bromo-4-chlorostyrylsulfonyl chloride, m.p. 93°–94°C., and acetamidine provide N-($\alpha$-BROMO-4-CHLOROSTYRYLSULFONYL)ACETAMIDINE, m.p. 156°–160°C., from chloroform in a yield of 81%.

f. $\alpha$-Bromo-4-nitrostyrylsulfonyl chloride, m.p. 123°–124°C., and acetamidine provide N-($\alpha$-BROMO-4-NITROSTYRYLSULFONYL)ACETAMIDINE, m.p. 184°–187°C., from acetonitrile, in a yield of 8%.

g. $\alpha$-Bromo-3,4-dichlorostyrylsulfonyl chloride and phenylacetamidine provide N-($\alpha$-BROMO-3,4-DICHLOROSTYRYLSULFONYL)-PHENYLACETAMIDINE.

h. $\alpha$-Bromo-2-nitrostyrylsulfonyl chloride and acetamidine provide N-($\alpha$-BROMO-2-NITROSTYRYLSULFONYL)ACETAMIDINE.

i. $\alpha$-Bromo-4-nitrostyrylsulfonyl chloride and benzamidine provide N-($\alpha$-BROMO-4-NITROSTYRYLSULFONYL)BENZAMIDINE.

j. $\alpha$-Bromo-2-fluorostyrylsulfonyl chloride and benzamidine provide N-($\alpha$-BROMO-2-FLUOROSTYRYLSULFONYL)BENZAMIDINE.

k. $\alpha$-Bromo-2,5-dichlorostyrylsulfonyl chloride and benzamidine provide N-($\alpha$-BROMO-2,5-DICHLOROSTYRYLSULFONYL)BENZAMIDINE.

l. $\alpha$-Bromo-4-sulfamoylstyrylsulfonyl chloride and acetamidine provide a N-($\alpha$-BROMO-4-SULFAMOYLSTYRYLSULFONYL)ACETAMIDINE.

m. $\alpha$-Bromo-4-methylstyrylsulfonyl chloride and acetamidine provide N-($\alpha$-BROMO-4-METHYLSTYRYLSULFONYL)ACETAMIDINE.

n. $\alpha$-Bromo-4-isopropylstyrylsulfonyl chloride and benzamidine provide N-($\alpha$-BROMO-4-ISOPROPYLSTYRYLSULFONYL)BENZAMIDINE.

o. $\alpha$-Bromostyrylsulfonyl chloride and isobutyramidine provide N-($\alpha$-BROMOSTYRYLSULFONYL)ISOBUTYRAMIDINE.

EXAMPLE 16

PREPARATION OF STYRYLSULFONYLAMIDINES a. A mixture of acetamidine hydrochloride (28.8 g., 0.15 mole) and 50% sodium hydroxide (12.0 g., 0.15 mole) in 150 ml. of acetone is stirred for a period of 10 min. to liberate the free base. A solution of styrylsulfonyl chloride (10.1 g., 0.05 mole) in 50 ml. of acetone is added dropwise to the mixture at a temperature of 20°–25°C. After further stirring for 10 min., the mixture is concentrated under reduced pressure to remove acetone, the concentrate diluted with 200 ml. of water and acidified with 3N hydrochloric acid to provide a precipitate. The precipitate is collected, dissolved in chloroform and the chloroform extract dried. Evaporation of the chloroform solvent under reduced pressure provides a white solid, m.p. 130°–134°C. which is crystallized from isopropyl acetate affording 8.5 g. (76% yield) of N-(STYRYLSULFONYL)ACETAMIDINE, m.p. 134.5°–137.0°C. (corr.).

Reaction of the styrylsulfonyl chlorides and amidines enumerated below according to the above procedure provides the following styrylsulfonylamidine precursors of the products of Formula II:

b. Styrylsulfonyl chloride and benzamidine provide N-(STYRYLSULFONYL)BENZAMIDINE.

c. 4-Chlorostyrylsulfonyl chloride and acetamidine provide N-(4-CHLOROSTYRYLSULFONYL)ACETAMIDINE.

d. 3,4-Dichlorostyrylsulfonyl chloride and phenylacetamidine provide N-(3,4-DICHLOROSTYRYLSULFONYL)-PHENYLACETAMIDINE.

e. 3,4-Dichlorostyrylsulfonyl chloride and benzamidine provide N-(3,4-DICHLOROSTYRLSULFONYL)BENZAMIDINE.

f. 2,5-Dichlorostyrylsulfonyl chloride and benzamidine provide N-(2,5-DICHLOROSTYRYLSULFONYL)BENZAMIDINE.

g. 3,4-Dichlorostyrylsulfonyl chloride and acetamidine provide N-(3,4-DICHLOROSTYRYLSULFONYL)ACETAMIDINE.

h. 4-Nitrostyrylsulfonyl chloride and acetamidine provide N-(4-NITROSTYRYLSULFONYL)ACETAMIDINE.

i. 2-Nitrostyrylsulfonyl chloride and acetamidine provide N-(2-NITROSTYRYLSULFONYL)ACETAMIDINE.

j. 4-Nitrostyrylsulfonyl chloride and benzamidine provide N-(4-NITROSTYRYLSULFONYL)BENZAMIDINE.

k. 2-Fluorostyrylsulfonyl chloride and benzamidine provide N-(2-FLUOROSTYRYLSULFONYL)BENZAMIDINE.

l. 4-Methylstyrylsulfonyl chloride and acetamidine provide N-(4-METHYLSTYRYLSULFONYL)ACETAMIDINE.

m. 4-Isopropylstyrylsulfonyl chloride and benzamidine provide N-(4-ISOPROPYLSTYRYLSULFONYL)BENZAMIDINE.

n. Styrylsulfonyl chloride and isobutyramidine provide N-(STYRYLSULFONYL)ISOBUTYRAMIDINE.

o. 4-Sulfamoylstyrylsulfonyl chloride and acetamidine provide N-(4-SULFAMOYLSTYRYLSULFONYL)ACETAMIDINE.

p. 3-Bromo-4-cyclohexylstyrylsulfonyl chloride and acetamidine provide N-(3-BROMO-4-CYCLOHEXYLSTYRYLSULFONYL)ACETAMIDINE.

What is claimed is:

1. A compound selected from the group consisting of 1,2,4-thiadiazines of the formula

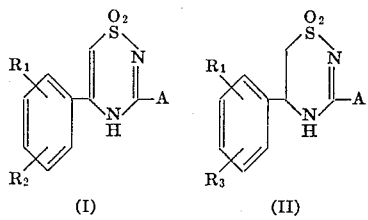

(I)    (II)

and a pharmaceutically acceptable metal salt thereof wherein $R_1$ is selected from hydrogen or halogen;

$R_2$ is selected from hydrogen, halogen, lower alkyl of from 1 to 4 carbon atoms inclusive, nitro, or sulfamoyl;

$R_3$ is selected from hydrogen, halogen, cyclohexyl or lower alkyl of 1 to 4 carbon atoms inclusive; and A is selected from lower alkyl of 1 to 3 carbon atoms inclusive, phenyl or benzyl.

2. A compound according to claim 1 consisting of 3-methyl-5-phenyl-4H-1,2,4-thiadiazine 1,1-dioxide.

3. A compound according to claim 1 consisting of 5-(4-chloro-3-sulfamoylphenyl)-3-methyl-4H-1,2,4-thiadiazine 1,1-dioxide.

4. A compound according to claim 1 consisting of 3,5-diphenyl-4H-1,2,4-thiadiazine 1,1-dioxide.

5. A compound according to claim 1 consisting of 5-(3,4-dichlorophenyl)3-methyl-4H1,2,4-thiadiazine 1,1-dioxide.

6. A compound according to claim 1 consisting of 5-(4-chlorophenyl)-3-methyl-4H-1,2,4-thiadiazine 1,1-dioxide.

7. A compound according to claim 1 consisting of 5-(3,4-dichlorophenyl)-3-phenyl-4H-1,2,4-thiadiazine 1,1-dioxide.

8. A compound according to claim 1 consisting of 3-methyl-5-(4 -nitrophenyl)-4H-1,2,4-thiadiazine 1,1-dioxide.

9. A compound according to claim 1 consisting of 5,6-dihydro-3-methyl-5-phenyl-4H-1,2,4-thiadiazine 1,1-dioxide.

10. A compound according to claim 1 consisting of 5-(4-chlorophenyl)-5,6-dihydro-3-methyl-4H-1,2,4-thiadiazine 1,1-dioxide.

11. A compound according to claim 1 consisting of 5,6-dihydro-3,5-diphenyl-4H-1,2,4-thiadiazine 1,1-dioxide.

* * * * *